Patented Aug. 29, 1939

2,171,222

UNITED STATES PATENT OFFICE 2,171,222

PROCESS FOR THE PREPARATION OF SALTS OF CELLULOSE ETHER CARBOXYLIC ACIDS

Georg Meyer, Hanover, Germany

No Drawing. Application February 24, 1938, Serial No. 192,323. In Germany March 1, 1937

1 Claim. (Cl. 260—232)

This invention relates to a process for the preparation of salts of cellulose ether carboxylic acids, which yield with water solutions of increased viscosity.

It is known to employ the water-soluble salts of carboxymethyl celluloses (cellulose ether carboxylic acids) as adhesives. These cellulose ether compounds are prepared by causing halogen fatty acids to react with cellulose, cellulose derivatives or cellulose-containing substances in the presence of alkali. Although the free acids are insoluble in water the purification of the reaction product cannot be effected in practice by adding aqueous solutions, such as acids, solutions of acid salts and the like, since the resulting colloidal carboxylic acids owing to their mucilaginous character can only be filtered with extreme difficulty and cannot be washed. Purification is therefore effected by precipitation and extraction with alcohol and the water soluble alkali salt of the cellulose ether is obtained as a powder by subsequent drying. It is nevertheless not possible in practice to prepare the same free from inorganic salts, since both sodium chloride and sodium hydroxide, which are present in large quantities in the reaction mixture, are relatively difficulty soluble in alcohol.

The alkali salt dissolves in cold water to a viscous sticky mass. The character of the aqueous solution is dependent on the number of carboxyl groups added to the cellulose molecule. The more viscous the solution is, the more productive and economic is its application.

According to this invention it has been unexpectedly found that salts of cellulose ether carboxylic acids, which yield solutions of very much higher viscosity, are obtained, by precipitating the reaction product obtained by the action of mono-halogen fatty acids on alkali cellulose with aluminium compounds, such as alum or aluminium acetate, freeing the precipitated product from the salts formed by washing with water and converting the products into water-soluble salts by adding equivalent quantities of alkali.

The water-insoluble aluminium compounds, in contradistinction to the other known precipitating agents, such as acids and acid salts, are thereby precipitated in a form, which can be extremely easily and conveniently filtered and washed completely free from salts. By adding the alkalies in aqueous solution a glue or size solution ready for use is obtained.

Accordingly, apart from the fact that in this manner the expensive extraction process with alcohol, which is moreover liable to catch fire, may be dispensed with, salt-free adhesive solutions of these water-soluble cellulose ethers are obtained in a form ready for use according to this invention without having to effect drying. Obviously the products obtained according to this invention may be dried in known manner and marketed in the form of a powder. This powder then merely requires to be immersed in cold water before use.

The colloidal solutions of the cellulose derivatives prepared according to this invention, owing to their increased viscosity, are particularly suitable as adhesives for pasting paper, wallpaper and the like, as book-binding size, as finishing and dressing agents and also as colour binding agents.

The following example serves to illustrate how the process of this invention may be carried into effect:

100 kgms. of unbleached cellulose are methylated in known manner with 140 kgms. of monochloracetic acid in the presence of alkali. The moist mass is diluted with water and 10% alum solution is added thereto until precipitation is complete. The precipitated aluminium compound is repeatedly washed with water and filtered. 30% soda lye is thereafter added to the precipitate until it just reacts weakly alkaline and the precipitate is adjusted by dilution with water to a concentration of about 4%. The resulting product is a highly viscous strongly adhesive size.

I claim:

A process for the preparation of salts of cellulose ether carboxylic acids, which yield with water solutions of increased viscosity, characterised in that the reaction product obtained by the action of a monohalogen fatty acid on alkali cellulose is precipitated with an aluminium compound, the precipitate is freed by washing with water from the salt formed and converted by the addition of equivalent quantities of alkali into a water-soluble salt.

GEORG MEYER.